April 4, 1961
W. MIKULAS
2,977,613
SWIMMING POOLS
Filed Oct. 29, 1958
2 Sheets-Sheet 1
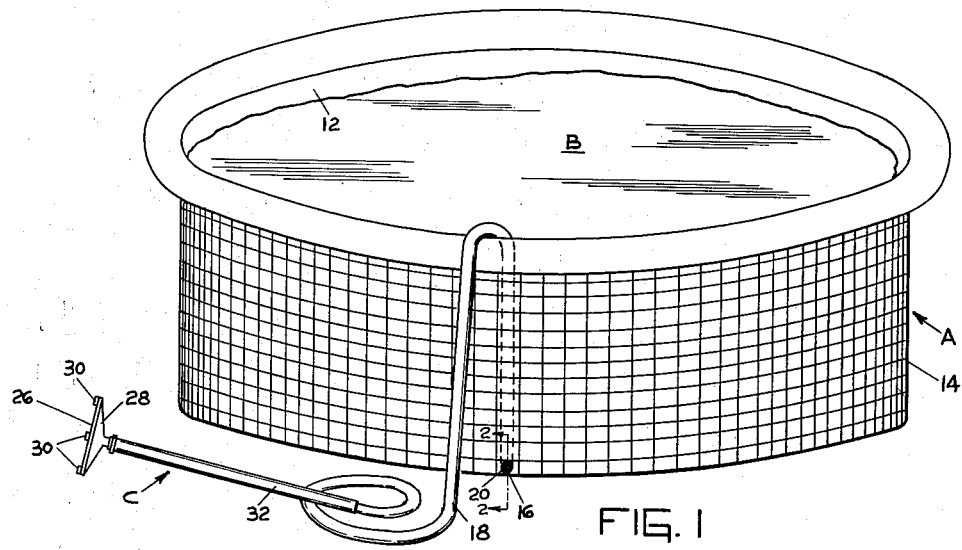
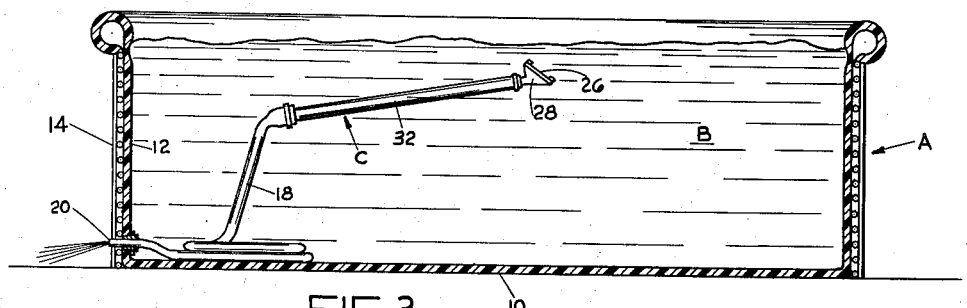
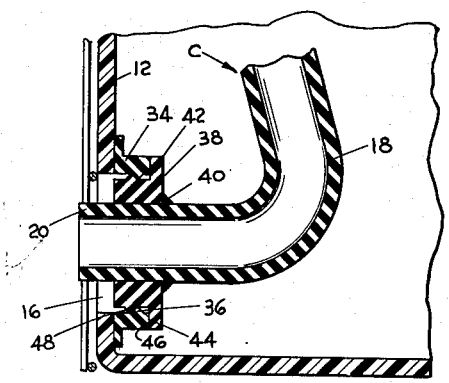
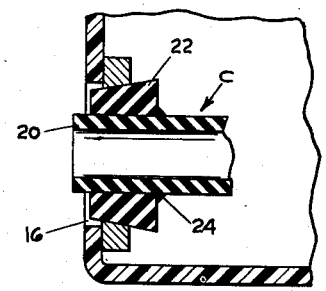
INVENTOR.
WILLIAM MIKULAS
BY
*Harry G. Shapiro*
ATTORNEY April 4, 1961 W. MIKULAS 2,977,613
SWIMMING POOLS
Filed Oct. 29, 1958 2 Sheets-Sheet 2

INVENTOR.
WILLIAM MIKULAS
BY
Harry G. Shapiro
ATTORNEY

United States Patent Office 2,977,613
Patented Apr. 4, 1961

2,977,613

SWIMMING POOLS

William Mikulas, 298 Deems Ave., Staten Island, N.Y.

Filed Oct. 29, 1958, Ser. No. 770,422

8 Claims. (Cl. 15—1.7)

The invention relates to swimming pools, and is more particularly directed to means for cleaning or removing contaminating materials from swimming pools.

Swimming pools of the above-ground type enjoy wide usage today. Pools of this type may be made of a variety of materials, such as plastic material, metal, etc. In the case of plastic material, the material may be fabricated for inflation, and whether or not inflated the side wall may be provided with supporting means.

In pools of this general type the water is not run off and replaced continuouslyy. After several days scum or slime begins to form in the stagnant water and accumulates on the sides of the pool. Before long such contaminating material adheres rather strongly to the sides of the pool, and some effort is required to remove it. Also, sand, dirt, pebbles and other debris may be tracked into the pool and will settle to the bottom. If the pool is located on a lawn where the grass has been recently cut and not removed, such material may also be transferred into the water, and will float on the top, together with other contaminating material which may have a density less than water. The term "contaminating material" as hereinafter used in the specification and claims, refers to slime, scum, dirt, sand, grit, pebbles and other deleterious substances or small objects which may find their way into a swimming pool.

The above-described conditions require that the pool be drained fairly frequently and refilled with fresh water. In addition, after drainage, the pool must be hosed-down and the bottom and sides scrubbed before refilling. This is a tedious and none too pleasant chore. Large quantities of water, therefore, are necessary to maintain the swimming pool in condition for use. Where water in the area is in short supply, the owner may be deprived of the use of his pool, because of the excessive quantities of water necessary to maintain it in use.

A primary object of the invention is to provide means adapted for cooperation with swimming pools to utilize the forces afforded by the water within the pool to remove contaminating material therefrom, thereby conserving a substantial quantity of water in the maintenance of the pool in useful condition.

Another object of the invention is to provide means adapted for connection to the usual drain outlet of a swimming pool, such means enabling the utilization of the pressure or head of water within the pool itself to furnish the force to remove contaminating material within the water and which has accumulated on the bottom and sides of the pool.

A further object of the invention is to provide means which utilizes or takes advantage of the head and/or the difference in pressure at different levels of the water contained within the pool to remove contaminating materials therefrom so that only a relatively small or minimum amount of water, which is discharged incident to the removal of the contaminating material, need be replaced to keep the pool in a suitably full, clean and usable condition. Also, a substantial quantity of water is conserved in that it becomes unnecessary to hose down the pool as customarily required after the pool is drained.

Still a further object of the invention is to provide a device which is constructed for simple and easy assembly with existing pools, such device being constructed to enable the removal of contaminating materials from any part of the pool in a manner which takes advantage of the head or difference in pressure at different levels of the water contained in the pool.

Still another object of the invention is to provide a simple and inexpensive device for use in combination with a pool, which allows for its easy manipulation in the operation of removing contaminating material from the pool.

These, and other objects and advantages are achieved by providing a cleaning device which is connected to the usual drain outlet in the vicinity of the bottom of a swimming pool. The cleaning device comprises tubing or hose which is flexible for at least a portion of its length. One end of the tubing, the discharge end, is connected to the drain outlet on the inner side of the pool so that the tubing extends within or into the pool. The periphery of the discharge end is in sealed engagement with the outlet. The tubing is of a length to permit the opposite or inlet end to be positioned closely adjacent any part, including the farthest point from the outlet, within the pool below the usual top water level where contaminating material may accumulate.

After the tubing is primed or filled with water, as by submerging the inlet end in the pool until water begins to flow out of the discharge end and the drain outlet, the device is ready for its function of removing contaminating material from the pool. Since the discharge end of the tubing is located at the drain outlet, which is a submerged orifice at substantially the lowest level of the water in the pool, positioning the inlet end closely adjacent to a surface within the pool anywhere above such low level causes motion of the water in the vicinity of the inlet end as the water enters the tubing. Contaminating material in the vicinity of the inlet end opening, aided by the turbulence created at this point, enters the tubing and flows therethrough to the discharge end and out of the outlet. Thus, the contaminating material floating on top of the water, or located on the sides of the pool above the level of the outlet, may be removed. Of course, some water is entrained with the contaminating material and discharged therewith.

In order to remove contaminating material located on the bottom of the pool, as well as from its inner sides, the tubing is made of sufficient length, and because of its flexibility for at least a portion thereof, to allow the tubing to be bent or formed into a generally inverted U-shape. The tubing length is selected for the particular size of the pool, such length being at least substantially equal to the hypotenuse of the side represented by farthest part of the pool from the outlet on the level of the outlet and the depth of the pool. For another purpose to be subsequently described, the tubing may be made even longer. In any event, the tubing is also of a length to permit forming the generally inverted U-shape therein. Thus, a siphon may be provided when the inlet end of the tubing is positioned closely adjacent the bottom of the pool, or the sides of the pool. The tubing length is sufficient to furnish substantial length to the arms of the siphon, the top of the bend preferably being located at least at the height of the pool. The siphon action, after priming of course, results in contaminating material, together with a small amount of water, entering the inlet end, flowing through the tubing, and out of the discharge end and the outlet. The head of water upon or above the inlet end supplies the force to cause the flow of water, with contaminating material, into the arms of siphon and out of the low point, submerged outlet.

When the inlet end is positioned above or beyond the water line in the pool, the sealed connection between the periphery of the discharge end and the outlet serves as a plug to prevent the discharge of water through the outlet.

While the tubing may be flexible along its entire length, and the inlet end grasped and held in the hand immediately to the rear of such inlet end to position it at the area desired, it is preferred that a section of rigid tubing be provided immediately rearward of the inlet end opening. The rigid tubing affords a handle to better enable positioning of the inlet end at the areas where it is desired to remove contaminating material. In addition, the section of rigid tubing facilitates forming the tubing into the inverted U-shape when it is desired to obtain the siphon action. Preferably, the rigid tubing section is of length to provide an arm of the siphon, with the upper end thereof located above the top level of the water when a pool of given size is filled.

Instead of using the bare opening at the inlet end of the tubing, it is preferred to provide such end with a vacuum cleaner-type nozzle attachment. Also, by using a vacuum cleaner-type nozzle attachment, with a usual brush element secured thereto adjacent or in surrounding relationship with respect to the nozzle opening, a brushing or scrubbing action may be provided in conjunction with the described suction or flow of the water, at the inlet end of the device.

In greater detail, reference is made to the following detailed description, together with drawings illustrating a preferred embodiment of the invention, in which:

Fig. 1 is a perspective view of a swimming pool having in cooperating relationship therewith a cleaning device in accordance with the invention, the position of the cleaning device as illustrated preventing the discharge of water from the outlet;

Fig. 2 is a vertical cross-section taken approximately plane of line 2—2 of Fig. 1;

Fig. 2A is view similar to Fig. 2 showing another form of connection between the outlet and the discharge end of the cleaning device;

Fig. 3 is a vertical cross-section of the swimming pool showing the inlet end of the cleaning device submerged in the water to prime the device preliminary to removing contaminating material from the pool;

Figure 5:
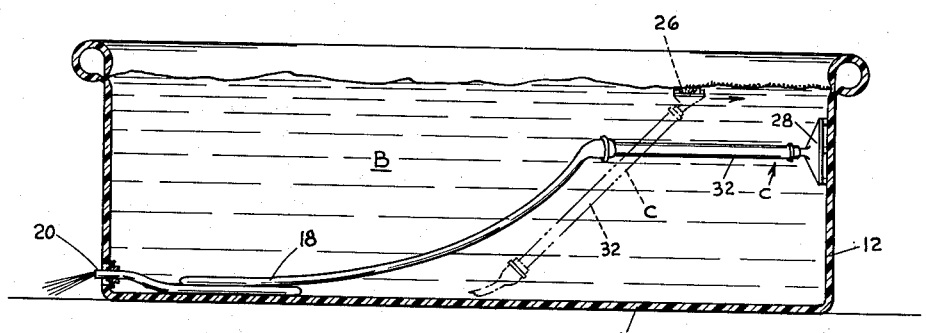
Figures 6, 7:
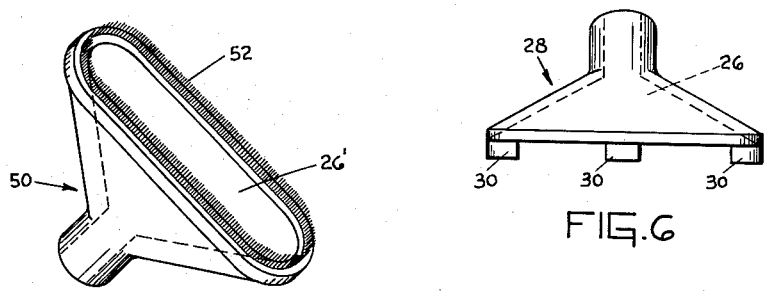

Fig. 5, also a vertical cross-section of the pool, shows the manner of operation when the device is used to remove contaminating material from a side of the pool, or from the top surface of the water;

Fig. 6 is a perspective view, on an enlarged scale, of a nozzle member suitable for the inlet end of the cleaning device; and Fig. 7 is a perspective view of another form of inlet nozzle, including a brush element.

Referring to Figs. 1, 2 and 3, a swimming pool A is shown filled with water B to a suitably useful or full level. The swimming pool may be of any desired type as previously described, the form illustrated being of plastic material and circular. The pool comprises a bottom 10 and a side wall 12. A suitable frame reinforcement 14 may be provided in contiguous relationship with respect to the side wall. The pool may be of any desired configuration, either circular as shown, or square or rectangular, and of any capacity. The greater the capacity and the deeper the pool, the more effective the device of the invention. As is common in swimming pools of the type under consideration, a drain outlet 16 is provided in the vicinity of the bottom level, the outlet as shown extending through the side wall 12 and practically coincident with the inner surface of the bottom wall 10.

The device for cleaning the pool or removing contaminating material therefrom, designated C, comprises flexible tubing 18, one end of which, the discharge end 20, is positioned in or connected to the drain outlet 16 so that the tubing extends from the inner side of the outlet and into the pool. As shown in Fig. 2, a waterproof seal is provided between the discharge end of the tubing and the drain outlet by providing its periphery with a circumferential, radially extending, tapered flange 22. The tapered flange may be molded integrally with the discharge end of the tubing. If desired, a plug may be provided with a central aperture to allow the discharge end of the tubing to extend therethrough, and the apertured plug or ring may be cemented to the periphery of the discharge end by a suitable cement 24.

In the preferred form of invention illustrated, the opposite or inlet end 26 of the tubing is provided with a vacuum cleaner-type nozzle attachment 28, as is commonly used for reaching into upholstery or other out-of-the-way places in conjunction with a moveable vacuum cleaner unit. As more particularly shown in Fig. 6, the front face of the nozzle attachment is provided with a plurality of spaced projections or studs 30 to space the inlet end or nozzle opening a small amount from the surface area of the pool to be cleaned.

To facilitate positioning and handling of the device A a section of rigid tubing 32 is connected to the nozzle member to extend rearwardly thereof, the opposite end of the rigid tubing being connected to the flexible tubing 18. The connections between the nozzle and the rigid tubing and the rigid tubing and the flexible tubing are made so that there is no obstruction to impede the passage or flow of water and contaminating material from the inlet end 26 to the discharge end 20; otherwise, contaminating material would accumulate at the areas where the parts are connected.

Figure 4:
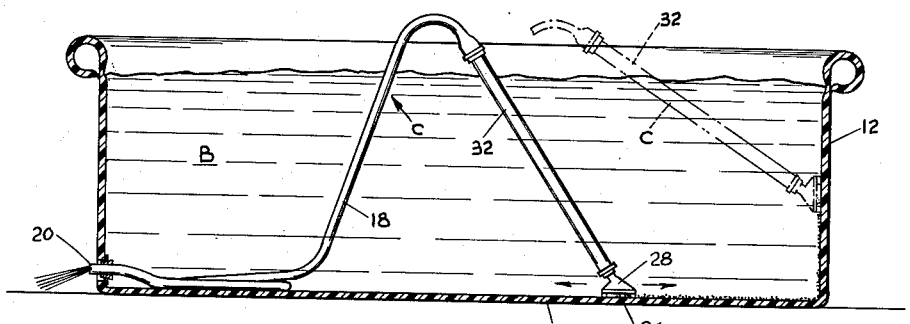
Fig. 4 is a vertical cross-section similar to Fig. 3 illustrating the operation for removing contaminating material from either the bottom or a side of the pool.

As will be apparent from a viewing of Figs. 1, 3, 4, and 5, the overall length of the tubing, flexible and rigid, between the discharge end 20 and the inlet end 26 is sufficient to permit the inlet end to be positioned at the farthest point within the pool from the outlet 16, while permitting, as shown in Fig. 4, forming the tubing into an inverted U for a portion of its length. In addition, the tubing is made of sufficient length, an extra 12 inches, for example, so that even when the inlet end is positioned adjacent the farthest point from the outlet, tension will not be applied to the connection between the discharge end and the outlet. Since pools presently manufactured are substantially greater in diameter or length than their height, it follows that tubing having the length described is substantially longer than the depth of water which may be contained in the pool. Thus, when the inlet end 26 is located above or beyond the top water level, as shown in Fig. 1, the water within the pool cannot discharge through the outlet; the outlet is plugged by the connection of the discharge end to the outlet on the inside of the pool.

As shown in Fig. 2A, the connection between the outlet 16 and the discharge end 20 may be provided with means to prevent separation of the tubing from the outlet when tension is applied to the tubing. As shown, a ring of resilient material 34 may be secured or cemented to the side wall 12 adjacent the outlet with the opening of the ring in communication with the outlet. The ring is provided with an internal, circumferential flange 36 which is preferably tapered. A sealing ring 38 is provided about the periphery of the discharge end of the tubing. This ring may be molded integrally with the tubing, or separately formed and secured to the tubing by a suitable cement 40. The ring 38 is provided with a circumferential, external shoulder 42, the inner face of which 44 is adapted to abut the face 46 of the sealing ring member 34. The sealing ring member 38 is also provided with an external, circumferential flange 48, which is preferably tapered as shown, for cooperation with the flange 36. The sealing ring members 34 and 38 being of resilient material, such as rubber, pushing the discharge end of the tubing into the outlet sealing ring 34 causes the flange 48 to snap over the flange 36. The elements are dimensioned so that when these flanges are so related, the shoulder 42 is in abutting and sealing engagement with the ring 34.

To remove contaminating material from within the pool the rigid tubing 32 is grasped by the hand, and with the flexible tubing 18 disposed within the pool, the inlet end 26 is submerged in the water, as shown in Fig. 3. As soon as the tubing is filled with water, as indicated by the discharge of water through the outlet 16, the device C is primed and ready for use.

To remove contaminating material from the bottom 10 of the pool, the rigid tubing handle 32 is placed in the position as illustrated in Fig. 4, with the nozzle 28 resting on the pool bottom. The inlet end is thus positioned closely adjacent the area where it is desired to remove contaminating material. The studs or spacers 30 permit the water and contaminating material to flow up into the nozzle. The head of water above the inlet end supplies the force which causes the contaminating material, and water, to flow up the arm of the siphon, represented by the rigid tubing 32, and down the other arm of the siphon, or down through the flexible tubing and out the discharge end and outlet. Back and forth movement of the nozzle across the pool bottom will serve to remove all contaminating material from this area of the pool. The handle provided by the section of rigid tubing may be sufficiently long to permit the user or operator to reach any part of the bottom as he stands outside of and adjacent the pool. If the pool is of large capacity and with a bottom of such large dimension that the center portion thereof is beyond the reach with the handle by a user standing outside of the pool, the user may station himself within the pool.

As also shown in Fig. 4 the siphon action may be used to remove contaminating material, primarily slime, which has accumulated on a side of the pool. This operation is indicated by the dotted line position of the cleaning device C. Such manner of cleaning is most effective for the lower portions of the pool sides, where the head of water above the inlet end is fairly substantial.

To remove contaminating material from the upper areas of the side walls the nozzle 28 is positioned adjacent such area as shown in Fig. 5. Here, advantage is taken of the difference in water level between the relatively high point where the inlet end or nozzle is located and the low point where the discharge end and outlet is located, as well as the head above the inlet end. The action or flow of liquid from a higher to a lower level, is also used to remove contaminating material which may be floating on top of the water, as indicated by the position of the cleaning device in dotted lines, as shown in Fig. 5.

Where the contaminating material adheres fairly strongly to a surface within the pool the studs 30, in addition to supplying the desired spacing function of the inlet end from the surface to be cleaned, may also serve to loosen the contaminating material by virtue of the motion and scraping action imparted to the nozzle. The spacing function, together with a scrubbing action, is preferably accomplished, however, by providing a nozzle 50, as shown in Fig. 7. The nozzle is provided with a brush element 52 adjacent to or in surrounding relationship with respect to the inlet opening 26'. The brush element is made sufficiently stiff so that pressure applied to the nozzle element will not result in its flattening to the point where water and contaminating material cannot enter the inlet or nozzle opening.

It is believed that the advantages of the invention will be apparent from the foregoing detailed description. The described means for removing contaminating material anywhere from within a pool is of simple construction, adapted for cooperation with existing types of swimming pools, and easily manipulated by the user or operator. The device of the invention makes it possible to conserve substantial quantities of water. A relatively small quantity of water is lost incident to the removal of the contaminating material, and there is no need to use the relatively large quantity of water to clean the pool after it has been drained.

While a preferred form of the invention has been illustrated and described, it will be apparent that various changes or modifications may be made without departing from the spirit and scope of the invention as sought to be defined in the claims.

I claim:

1. In combination with a swimming pool having a drain outlet in the vicinity of the bottom thereof, means for removing contaminating material from within the pool having a level of water above the level of the drain outlet, said means comprising tubing having its discharge end connected to said outlet so that the tubing extends into the pool from the inner side thereof, the tubing being flexible for at least a portion of its length, the tubing being of a length to permit the positioning of the opposite inlet end adjacent an area within the pool to be cleaned and the positioning of the inlet end above the level of water in the pool when full to the top to prevent the discharge of water through the outlet.

2. In combination with a swimming pool having a drain outlet in the vicinity of the bottom level thereof, means for removing contaminating material from within the pool having a level of water above the level of the drain outlet, said means comprising tubing having its discharge end connected to said outlet so that the tubing extends into the pool from the inner side thereof, the periphery of the tubing being in sealing engagement with the outlet, the tubing being flexible for at least a portion of its length, the tubing being of a length to permit the positioning of the opposite inlet end adjacent an area within the pool to be cleaned and the positioning of the inlet end above the level of water in the pool when full to the top to prevent the discharge of water through the outlet, the inlet end being provided with a vacuum cleaner-type nozzle attachment at the end of a rigid tubular portion providing a handle, the rigid portion of the tubing being connected in flow communication with said flexible portion.

3. A device as set forth in claim 2, wherein a brush element is provided surrounding the nozzle opening.

4. In combination with a swimming pool having a drain outlet in the vicinity of the bottom thereof, means for removing contaminating material contained in the water and on the bottom and sides within the pool having a level of water above the level of the drain outlet, said means comprising tubing having its discharge end connected to said outlet so that the tubing extends into the pool from the inner side thereof, the periphery of the tubing being in sealing engagement with the outlet, the tubing being flexible for at least a portion of its length, the tubing being of a length to permit forming a generally inverted U-shaped siphon thereof when the opposite inlet end is positioned closely adjacent the bottom of the pool and the positioning of the inlet end above the level of water in the pool when full to the top to prevent the discharge of water through the outlet.

5. In combination with a swimming pool having a drain outlet in the vicinity of the bottom thereof, means for removing contaminating material contained in the water and on the bottom and sides within the pool having a level of water above the level of the drain outlet, said means comprising tubing having its discharge end connected to said outlet so that the tubing extends into the pool from the inner side thereof, the periphery of the tubing being in sealing engagement with the outlet, the tubing being flexible for at least a portion of its length, the tubing being of a length to permit forming a generally inverted U-shaped siphon thereof when the opposite inlet end is positioned closely adjacent the bottom of the pool, said tubing length permitting positioning of the inlet end closely adjacent the surface within the pool, when full, which is farthest from the outlet and below the water level, and the positioning of the inlet end above the level of water in the pool when full to the top to prevent the discharge of water through the outlet, the inlet end being provided with a vacuum cleaner-type nozzle attachment at the end of a rigid tubular portion, said rigid portion providing a handle to assist in the positioning of the inlet end and enabling imparting the inverted U-shape to the tubing.

6. In combination with a swimming pool having a drain outlet in the vicinity of the bottom thereof, means for removing contaminating material contained in the water and on the bottom and sides within the pool having a level of water above the level of the drain outlet, said means comprising tubing having its discharge end connected to said outlet so that the tubing extends into the pool from the inner side thereof, the periphery of the tubing being in sealing engagement with the outlet, the tubing being flexible for at least a portion of its length, the tubing being of a length to permit forming a generally inverted U-shaped siphon thereof when the opposite inlet end is positioned closely adjacent the bottom of the pool, said tubing length permitting positioning of the inlet end closely adjacent the surface within the pool, when full, which is farthest from the outlet and below the water level, without placing tension on the connection between the outlet and the discharge end of the tubing, and the tubing being of such length that positioning of the inlet end above the level of water in the pool when full to the top prevents the discharge of water through the outlet, the inlet end being provided with a vacuum cleaner-type nozzle attachment at the end of a rigid tubular portion, the rigid portion of the tubing being connected in flow communication with said flexible portion, said rigid portion providing a handle to assist in the positioning of the inlet end and enabling imparting the inverted U-shape to the tubing, said rigid tubular portion having a length at least substantially equal to the depth of the pool.

7. A device as set forth in claim 6, wherein a brush element is provided surrounding the opening of the nozzle.

8. In the combination set forth in claim 4, tubing having a length sufficient to allow the top of the bend of the generally inverted U-shaped siphon formed thereof to be located at least at the height of the pool.

References Cited in the file of this patent

UNITED STATES PATENTS

| | | |
|---|---|---|
| 755,747 | Coile | Mar. 29, 1904 |
| 919,606 | Locke | Apr. 27, 1909 |
| 1,516,359 | Tideman | Nov. 18, 1924 |
| 1,738,017 | Phillips | Dec. 3, 1929 |
| 1,786,613 | Hooper | Dec. 30, 1930 |
| 2,710,984 | Grueter | June 21, 1955 |

FOREIGN PATENTS

| | | |
|---|---|---|
| 411,253 | Great Britain | June 7, 1934 |